US007011329B2

(12) United States Patent
Yoder

(10) Patent No.: US 7,011,329 B2
(45) Date of Patent: Mar. 14, 2006

(54) TOW BAR WITH TORSION SPRING LIFT ASSIST AND METHOD

(75) Inventor: C. Ray Yoder, Niceville, FL (US)

(73) Assignee: Yoder Brake & Manufacturing Company, Crestview, FL (US)

( * ) Notice: Subject to any disclaimer, the term of this patent is extended or adjusted under 35 U.S.C. 154(b) by 59 days.

(21) Appl. No.: 10/795,472

(22) Filed: Mar. 8, 2004

(65) Prior Publication Data
US 2005/0194763 A1   Sep. 8, 2005

(51) Int. Cl.
B62D 1/34 (2006.01)
(52) U.S. Cl. ............... 280/493; 280/485; 280/486; 280/489
(58) Field of Classification Search ........ 280/483–489, 280/492–494
See application file for complete search history.

(56) References Cited

U.S. PATENT DOCUMENTS

| 3,331,618 | A | 7/1967 | Head et al. |
| 3,649,048 | A | 3/1972 | Garnett |
| 4,351,542 | A | 9/1982 | Lovell et al. |
| 4,471,973 | A | 9/1984 | Beckmann, Sr. |
| 5,240,273 | A | 8/1993 | Stead et al. |
| 6,135,485 | A | 10/2000 | Filbrun |
| 6,494,478 | B1 | 12/2002 | MacKarvich |

Primary Examiner—Lesley D. Morris
Assistant Examiner—Matthew Luby
(74) Attorney, Agent, or Firm—Fraser Martin & Miller LLC; Donald R. Fraser

(57) ABSTRACT

A tow bar with a torsion spring disposed between the tow bar and a steering arm to urge the tow bar towards an operating position, the torsion spring minimizing the force required by an operator to lift the tow bar.

10 Claims, 2 Drawing Sheets

TOW BAR WITH TORSION SPRING LIFT ASSIST AND METHOD

FIELD OF THE INVENTION

The present invention relates to a tow bar assembly and more particularly to a tow bar assembly including a torsion spring disposed between the tow bar and steering arm to urge the tow bar towards an operating position.

BACKGROUND OF THE INVENTION

It is known generally to draw trailers with a tow bar. In the aviation industry, for example, trailered ground power units and other trailers are frequently coupled to a towing vehicle by a tow bar. It is also known in this and other applications to pivotally couple the tow bar to a steering arm of the trailer to permit positioning the tow bar between raised and lowered positions. The tow bar is generally lowered to a substantially horizontal position for coupling to the towing vehicle, and raised to a generally vertical position to eliminate any obstruction posed thereby and to facilitate stowage thereof when not coupled to the towing vehicle.

Prior art tow bars have the disadvantage that, when lowered, the tow bar tends to pivot downwardly until an end thereof strikes the ground. It is undesirable for the tow bar to contact the ground as the tow bar may become damaged, particularly the end portion thereof that hitches to the towing vehicle. In addition, if dropped, the tow bar can cause injury to an operator's foot.

When being connected to the towing vehicle, the tow bar must be raised upwardly from the ground. Raising the tow bar and bearing the weight of the tow bar during alignment with the vehicle hitch is inconvenient, and in some applications may require substantial physical exertion.

It would be desirable produce a tow bar assembly where the force required to raise the tow bar is minimized.

SUMMARY OF THE INVENTION

Consistent and consonant with the present invention, a tow bar assembly where the force required to raise the tow bar is minimized, has surprisingly been discovered.

The tow bar assembly comprises a tow bar having a first end, the tow bar adapted to be coupled with a towing vehicle, the first end of the tow bar having at least one aperture formed therein; a pin supported by a steering arm of a towed vehicle, the pin disposed in the at least one aperture of the tow bar to facilitate a pivotal movement of the tow bar about the pin; a spring supported by the pin and having a first linear spring extension and a second linear spring extension, the first spring extension extending outwardly from the spring into contact with the tow bar to urge the tow bar in an upward direction, the second spring extension adapted to contact the steering arm of the towed vehicle.

BRIEF DESCRIPTION OF THE DRAWINGS

The above, as well as other objects, features, and advantages of the present invention will be understood from the detailed description of the preferred embodiments of the present invention with reference to the accompanying drawings, in which.

DETAILED DESCRIPTION OF THE PREFERRED EMBODIMENT

Figure 1:
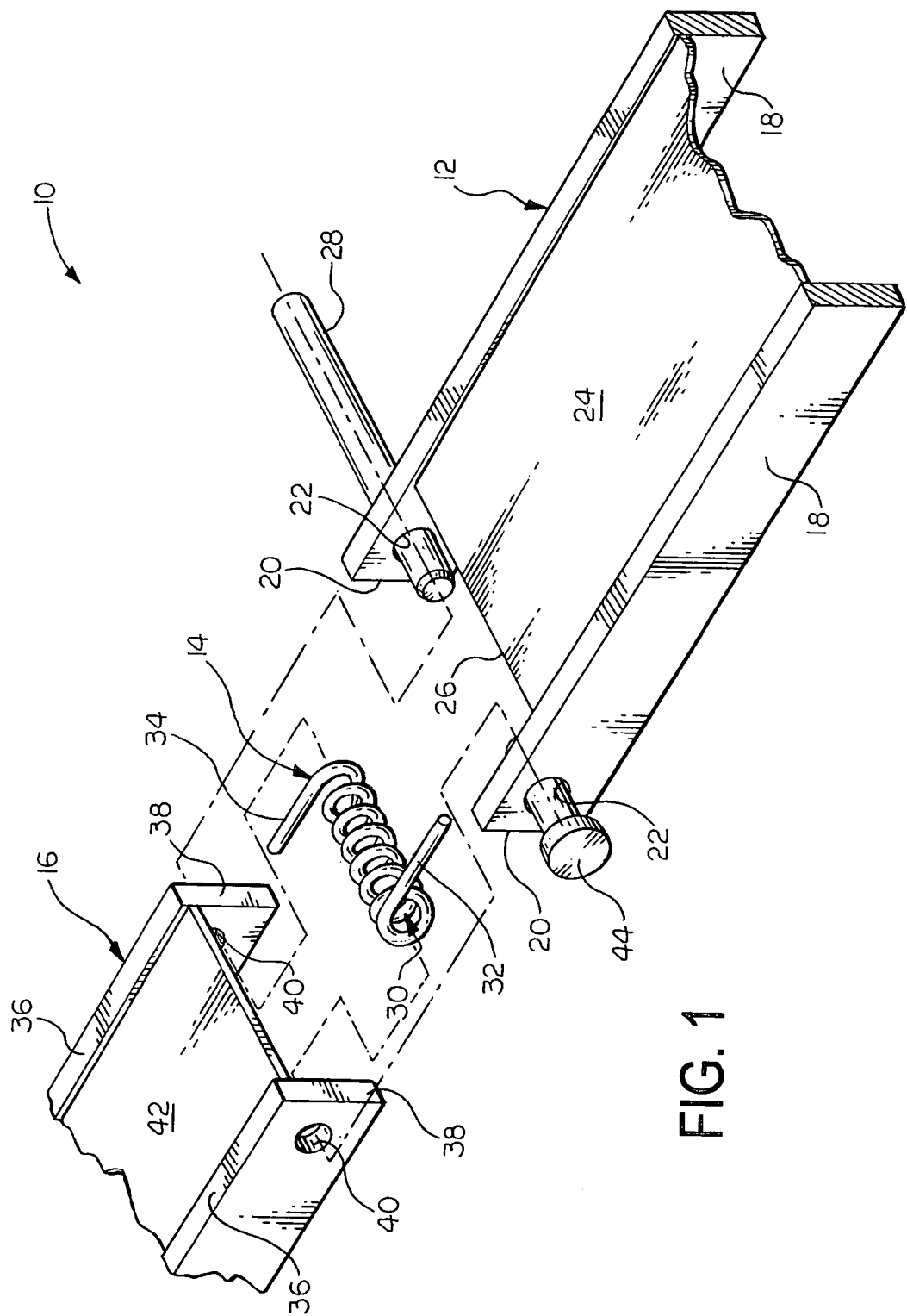
FIG. 1 is an exploded partial perspective view of a tow bar and a steering arm assembly and an insertion assist pin in accordance with the present invention.
Figure 2:
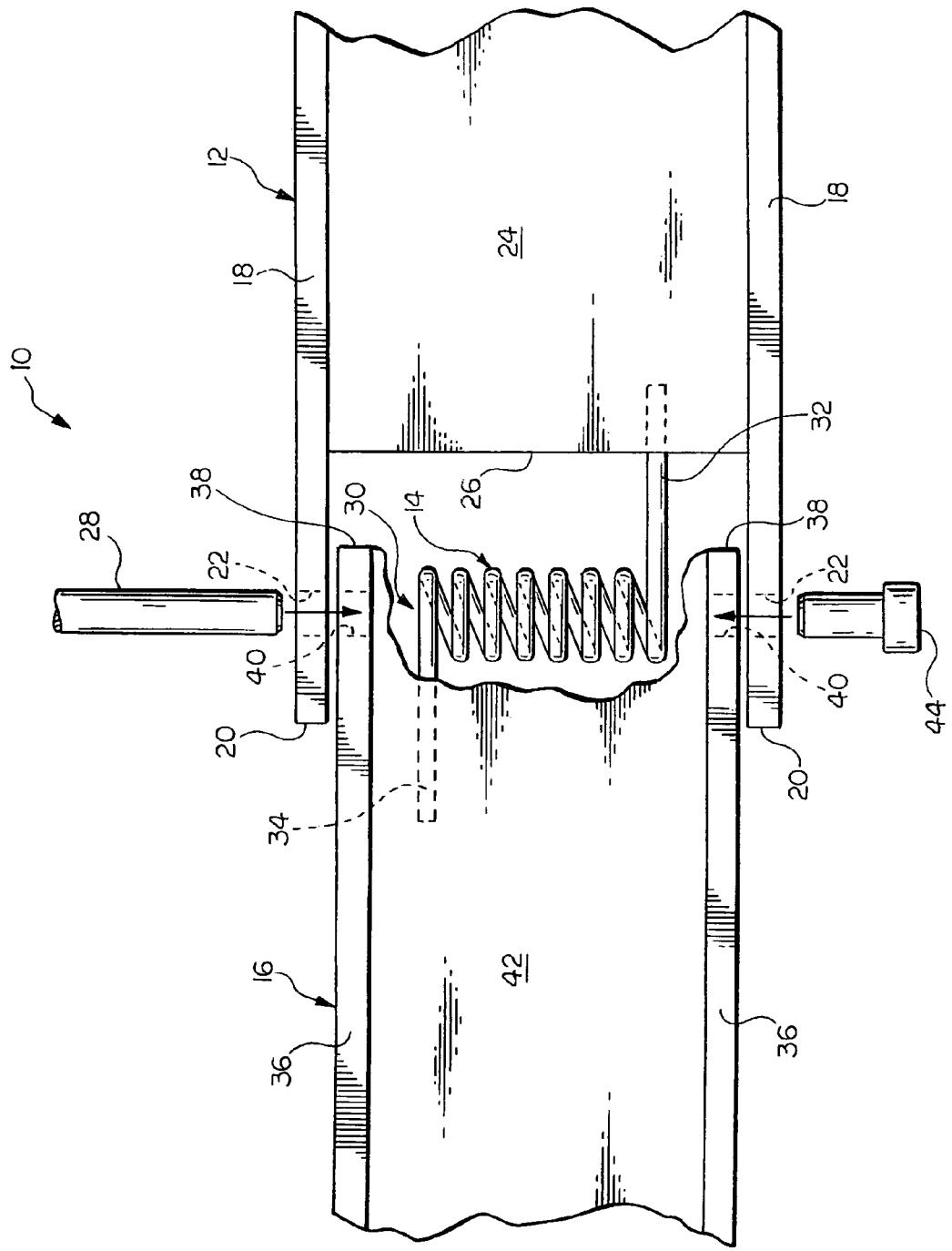
FIG. 2 is a partial plan view of the tow bar illustrated in FIG. 1, with a hitch pin removed and a portion of the steering arm cut away.

Referring now to FIGS. 1 and 2, there is shown generally at 10 a tow bar and steering arm assembly in accordance with the present invention. The tow bar and steering arm assembly 10 includes an elongate tow bar or draw bar 12, a torsion spring 14, and a steering arm 16. In the embodiment shown, the tow bar 12 includes a pair of spaced apart longitudinally extending side rails or edge portions 18. A first end 20 of each of the side rails 18 has a laterally extending aperture 22 formed therein. A web 24 extends between the pair of side rails 18 to form an inverted u-shaped channel. A first end 26 of the web 24 is spaced from the first end 20 of the side rails 18 to expose the apertures 22. The apertures 22 of the side rails 18 of the tow bar 12 are aligned to receive a hitch pin or bolt 28 therein. The other end of the tow bar 12 is adapted to be connected to a towing vehicle (not shown).

The torsion spring 14 is formed by a series of helically wound coils defining an open interior 30. The hitch pin 28 is received in the interior 30 of the spring 14. A first end or extension 32 of the spring 14 extends radially outwardly in intimate contact with a bottom portion of the tow bar 12 when assembled. A second end or extension 34 of the spring 14 extends radially outwardly from the other end of the torsion spring 14 in intimate contact with a bottom portion of the steering arm 16 when assembled. When assembled, the spring 14 is disposed between the side rails 18 of the tow bar 12, allowing use of the original hitch pin 28 and not requiring use of a new, longer pin. Additionally, the first end 32 of the spring 14 and the second end 34 of the spring 14 facilitate the use of the original tow bar 12 and the steering arm 16, without the use of additional parts or hardware. It is understood that other spring types could be used without departing from the scope and spirit of the invention.

The steering arm 16 includes a pair of spaced apart longitudinally extending side rails 36. A first end 38 of each of the side rails 36 has a laterally extending aperture 40 formed therein. A web 42 extends between the pair of side rails 36 to form an inverted unshaped channel. The apertures 40 of the side rails 36 of the steering arm 16 are aligned to receive the hitch pin 28 therein. The other end of the steering arm 16 is adapted to be connected to a trailer or towed vehicle (not shown). The cross sectional shapes of the tow bar 12 and the steering arm 16 are not critical to the invention and other cross sectional shapes and configurations such as square tubing, for example, may be used for the tow bar 12 and the steering arm 16 without departing from the scope and spirit of the invention.

To assemble the tow bar and steering arm assembly 10, the tow bar 12 and the steering arm 16 are axially aligned in a substantially horizontal position. The apertures 22 of the side rails 18 of the tow bar 12 are aligned with the apertures 40 of the side rails 36 of the steering arm 16. The hitch pin 28 is inserted through one set of the aligned apertures 22, 40 as indicated by the arrow in FIG. 2.

An insertion assist pin 44 is inserted through the other set of aligned apertures 22, 40 as indicated by the arrow in FIG. 2 to maintain the desired alignment of the tow bar 12 and the steering arm 16. The tow bar 12 is pivoted about the hitch pin 28 and the assist pin 44 to a substantially vertical position. The interior 30 of the torsion spring 14 is aligned with the apertures 40 of the side rails 36 of the steering arm 16. The hitch pin 28 is then caused to slide through the interior 30 of the torsion spring 14, into contact with the assist pin 44. The assist pin 44 is caused to slide out of the set of apertures 22, 40, and is replaced therein by the hitch pin 28. The hitch pin 28 is then secured in place with fasteners or safety pins,(not shown), for example, to militate against axial movement of the hitch pin 28. The tow bar 12 is then lowered to a substantially horizontal position for operation, thereby loading the torsion spring 14. Thus, the tow bar 12 is urged in an upward direction or towards a vertical position by the torsion spring 14. It will be appreciated that the spring 14 is effective to maintain the tow bar 12 and the steering arm 16 in a substantially axially aligned horizontal position. Any downward loading of one or the other of the pivotally interconnected members will tend to wind the spring 14 and militate against any relative downward pivotal movement.

To disassemble the tow bar and steering arm assembly 10, the tow bar 12 is raised to the substantially vertical position. The fasteners or the safety pins are removed from the hitch pin 28. The assist pin 44 is placed into contact with the hitch pin 28 causing the hitch pin 28 to slide out of the one set of apertures 22, 40. The hitch pin 28 is then caused to slide out of the interior 30 of the torsion spring 14, thus freeing the torsion spring 14. Further disassembly by removal of the hitch pin 28 or replacement of the torsion spring 14 can be accomplished as desired.

In use, once the tow bar and steering arm assembly 10 is assembled, the tow bar 12 is pivotable about the hitch pin 28. When the trailer or towed vehicle is not being towed, the tow bar 12 can be positioned vertically. When the operator lifts the tow bar 12 to the vertical position, the torsion spring 14 urges the tow bar 12 upward, thus assisting the operator in lifting the tow bar 12. When it is desired to tow the trailer or towed vehicle, the tow bar 12 is lowered to the substantially horizontal position, and held in this position while being coupled to the towing vehicle. The torsion spring 14 urges the tow bar 12 upward during the coupling operation, thus reducing the lifting forces required and assisting the operator in holding the tow bar 12 in the desired position.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A tow bar and a steering arm assembly for coupling a towing vehicle to a towed vehicle, the assembly comprising:
   a tow bar having a first end and spaced apart edge portions, said tow bar adapted to be coupled with the towing vehicle, the first end of said tow bar having at least one aperture formed therein;
   a pin adapted to be received in the steering arm, said pin disposed in the at least one aperture of said tow bar to facilitate a pivotal movement of said tow bar about said pin;
   a spring adapted to surround said pin and having a first extension and a spaced apart second extension, the first extension extending outwardly from said spring into contact with said tow bar to urge said tow bar in an upward direction, the second extension adapted to contact the steering arm, wherein said spring is disposed between the edge portions of said tow bar.

2. The assembly according to claim 1, wherein said spring is a torsional spring.

3. The assembly according to claim 2, wherein said spring includes an open interior which receives said pin therein.

4. The assembly according to claim 1, wherein a pair of apertures is formed in the first end of said tow bar to hingedly receive said pin therein.

5. The assembly according to claim 1, wherein said tow bar includes pair of spaced apart, longitudinally extending side rails.

6. A tow bar assembly for coupling a towing vehicle to a towed vehicle, the assembly comprising:
   a tow bar having a first end, said tow bar adapted to be coupled with the towing vehicle, the first end of said tow bar having at least one aperture formed therein;
   a steering arm having a first end, said steering arm connected to the towed vehicle, the first end of said steering arm having at least one aperture formed therein;
   a pin received in the at least one aperture of said steering arm, said pin disposed in the at least one aperture of said tow bar to effect pivotal movement of said tow bar about said pin;
   a spring surrounding said pin and having a first extension and a second extension, the first extension extending linearly outwardly from said spring and adapted to contact said tow bar to urge said tow bar in an upward direction, the second extension extending linearly outwardly from said spring and adapted to contact said steering arm, wherein said spring is disposed between the at least one aperture formed in said tow bar and the at least one aperture formed in said steering arm.

7. The assembly according to claim 6, wherein said spring is a torsional spring.

8. The assembly according to claim 7, wherein said spring includes an open interior which receives said pin therein.

9. The assembly according to claim 6, wherein a pair of apertures is formed in the first end of said tow bar to hingedly receive said pin therein.

10. A method of assembling a tow bar and a steering arm assembly for coupling a towing vehicle to a towed vehicle, the method comprising the steps of:
    providing a tow bar having a first end, the tow bar adapted to be coupled with the towing vehicle, the first end of the tow bar having a first aperture and a second aperture formed therein;
    providing a steering arm having a first end, the steering arm adapted to be connected to the towed vehicle, the first end of the steering arm having a first aperture and a second aperture formed therein;
    providing a hitch pin and an assist pin;
    inserting one of the hitch pin and the assist pin through the first aperture of the tow bar and the first aperture of the steering arm;
    inserting an other of the hitch pin and the assist pin through the second aperture of the tow bar and the second aperture of the steering arm;
    pivoting the tow bar about the hitch pin and the assist pin to a substantially vertical position;
    providing a spring having an open interior formed therein; and
    causing the hitch pin to slide through the interior of the spring into contact with the assist pin, and causing the assist pin to slide out of the second aperture of the steering arm and the second aperture of the tow bar.

* * * * *